United States Patent Office 3,524,979
Patented Aug. 18, 1970

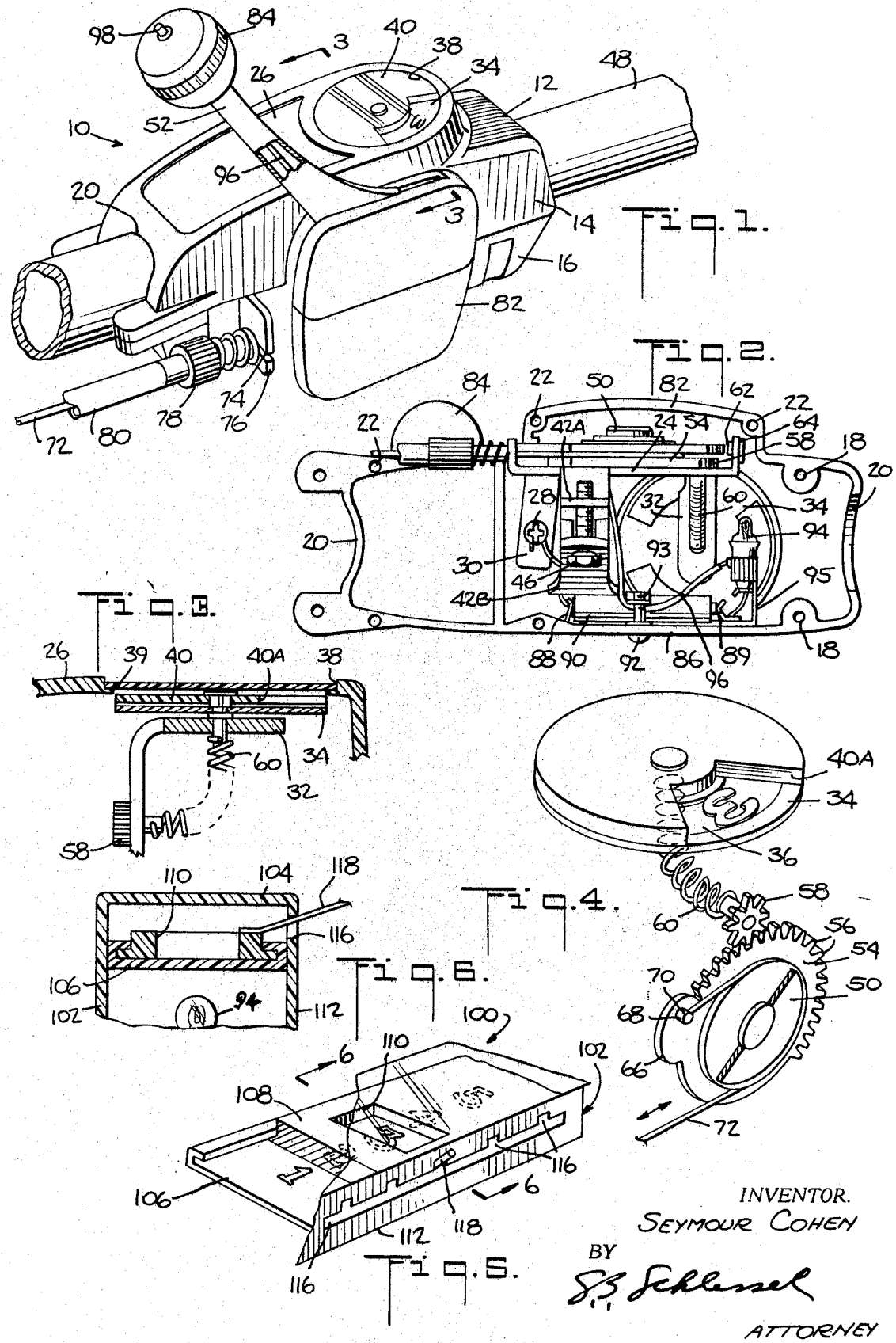

3,524,979
ILLUMINATED GEARSHIFT SELECTOR
Seymour Cohen, Wantagh, N.Y., assignor of one-third each to Richard Schott, Scarsdale, and Arthur Wachtel, Brooklyn, N.Y.
Filed Aug. 11, 1969, Ser. No. 848,983
Int. Cl. F21v 33/00
U.S. Cl. 240—2        11 Claims

ABSTRACT OF THE DISCLOSURE

An illuminated gearshift selector, for a bicycle, having a movable stick shift. The stick shift is in engagement with both a gear cable and an opaque movable panel positioned over a fixed transparent panel having indicator markings thereon. There is an opening in the movable panel which discloses a section of the fixed panel. The movement of the stick shift simultaneously shifts gears and discloses which gear is in operation through the movable panel on the fixed panel. Illumination is provided within the housing to direct light from within the housing through the fixed panel. The light is controlled by manipulation of the stick shift.

---

This invention relates to the field of gearshift mechanisms, particularly for bicycles and the like, and has for its objective the creation of a gearshift selector, adapted to be attached to a multi-geared bicycle and having an indicator panel showing which gear is in operation, with means provided internally whereby light is directed toward the panel from the interior to light up the particular gear indicator so that the latter is visible to the operator, both in the process of shifting gears and also whenever he desires to ascertain which gear is in operation.

As is well known, many bicycles are presently constructed with multiple gears disposed in the rear wheel so that, by shifting of the gears, the wheel is rotated at different speeds with the same foot action of the operator, resulting in greater or lesser speeds. The number of gear members usually provided range from three to as many as ten, and a gearshift mechanism to shift these gears is generally attached to the central bar or connecting rail of the bicycle, within easy reach of the rider, with the connecting shift cable extending therefrom to engage the gears.

In the present state of the art numerous types of shift selectors have been and are being used which effectively provide the means to shift the gears in a bicycle to low, medium or high, and to intermediate speeds. In daylight these types of selectors are adequate and the rider can see by the indicator panel which gear is being used, and can shift to another gear as desired. In dusk and night riding, however, which is becoming more frequent, the rider is at a disadvantage, since he is unable to see the indicator panel to ascertain which gear is being used, nor is he able, with certainty, to shift to another particular gear speed.

It is therefore the principal object of my invention to provide a gearshift selector which is provided internally with light means adapted, when activated, to illuminate the shift panel from within, so as to make visible the specific section to indicate the gear in operation.

A second important object of my invention lies in the provision of a gearshift selector of the type described wherein the internal light means is activated by a dry cell battery.

A third important object of my invention lies in the provision of a gearshift indicator and selector of the type described wherein the internal light means can be activated simultaneously with the shifting of gears.

A fourth important object of my invention lies in the provision of a gearshift selector wherein the internal light means can be activated independently of the shifting of gears.

These and other salient objects, advantages and functional features of my invention, together with the novel features of construction, composition and arrangement of parts, will be more readily apparent from an examination of the following description, taken with the accompanying drawings, wherein:

FIG. 1 is a top perspective view of a preferred embodiment of my invention;

FIG. 2 is a bottom view of the upper half of the embodiment shown in FIG. 1;

FIG. 3 is an enlarged cross-sectional view, taken on lines 3—3 of FIG. 1;

FIG. 4 is an exploded view of the gear shift elements cooperative with the gear indicator panel;

FIG. 5 is a top perspective view, partly in section, of the upper portion of a modified form of gearshift selector; and FIG. 6 is a cross-sectional view, taken on lines 6—6 of FIG. 5.

Similar reference characters designate similar parts throughout the different views.

Illustrative of the embodiment shown by FIGS. 1–4, my illuminated gearshift selector 10 comprises a housing 12 composed of an upper section 14 and a lower section 16 secured together by screws passing through the lower section 16 into threaded bores 18 on the base of the upper section 14, to define a central cavity in the housing 12, the housing 12 having a central circular opening 20 at each end. Pins 22, extending from the base of the upper section 14 fit into suitable recesses (not shown) in the lower section 16 to provide a precision fit of the two sections 14 and 16.

Referring to FIG. 2, a support member 24 is secured to the roof 26 of the upper section 14 by a screw 28 passing through an L-shaped extension 30 of the member 24, located at one end thereof, a second L-shaped extension 32 being provided at the other end of the member 24, to which there is secured a fixed transparent disc 34, which is divided into three spaced and arcuate sections 36, corresponding to the three gear speeds to be indicated by the selector 10, each section 36 designated with a number to indicate the respective speed to which the corresponding gear is adjusted, as will hereinafter be shown, e.g., the numeral "3" indicating that the gears have been shifted to "3rd," or "high" speed. The disc 34 is mounted in a circular opening 38 in the roof 26, below a glass window 39, supporting above it a rotative disc 40, which is opaque and provided with a cut-out section 40A corresponding to, and adapted to come in registry with, one of the arcuate sections 36 of the disc 34 by selective rotation of the disc 40, as will hereinafter be shown, to reveal one of the sections 36 at a time.

The support member 24 is inwardly extruded intermediate its ends to form one element 42A of a clamp member 44, the other element 42B being engaged to the element 42A at one end by a slot, tongue arrangement and at the other end by a threaded bolt 46 secured through both elements of the clamp member 44, as shown in FIG. 2, the clamp member 44 being thereby adapted to secure the housing 12 to the connecting bar or rail 48 of a bicycle, as shown in FIG. 1.

A stud 50 is threaded through a central opening in the support member 24 from the outer side thereof, and upon the stud 50 there are mounted a stick shift 52 and a gear wheel 54 having engaging means with one another whereby rotation of the stick shift 52 causes corresponding rotation of the gear wheel 54 around the shaft of the stud 50. The gear wheel 54 is provided with teeth 56 semi-circularly, with the teeth 56 adapted to mesh with a spur gear 58 disposed on the surface of the support member 24 and secured, through an opening in the support member 24, to a torque spring 60, whose other end is secured to the rotative disc 40 through the fixed disc 34 and the extension 32, whereby rotation of the spur gear 58 causes rotation of the disc 40.

The base portion of the stick shift 52 is enlarged and irregular in circumference, and is provided with three spaced notches (not shown) adapted to lock the stick shift 52 into three rotative positions, corresponding to the three positions by which a different arcuate section 36 of the disc 34 becomes visible through the cut-out section 40A of the disc 40 by the rotation of the spur gear 58 in its engagement with the gear wheel 54, activated by rotation of the stick shift 52, by the engagement of a notch with a ball bearing 62 secured in an extrusion 64 of the support member 24, which abuts the base portion of the stick shift 52.

The gear wheel 54 is provided opposite its teeth 56 with an extension 66 having an opening adapted to receive and hold the enlarged end 70 of a gear cable 72, whereby rotation of the stick shift 52, and thus of the gear wheel 54 causes reciprocal movement of the cable 72, as shown by FIG. 4.

Th cable 72 extends from the gear wheel 54 through a slotted opening 74 in an extrusion 76 of the support member 24, and through a hollow, spring-tension screw member 78 mounted in the extrusion 76, and is secured at its terminal end to the gear mechanism (not shown) of the bicycle wheel, as is well known in the art, the cable 72 being protected along its length by a sleeve 80 and adapted for reciprocal movement therethrough.

The side of the upper section 14, adjacent the support member 24, is extruded to form a wing 82 parallel to the support member 24 and open at its top to allow extension of the stick shift 52 out of the housing 12 and rotation of the stick shift 52 to shift gears as indicated. The stick shift 52 is hollow and topped by a hand knob 84 by which the stick shift 52 is grasped and manipulated.

Coming, now, to the illumination features of my invention, the side wall 86 of the upper section 14 is provided with bracket ends 88 and 89 adapted to hold a dry cell battery 90 secured in place by a screw 92 passing through the ends of an intermediate clamp 93. The bracket 88 is in engagement with the extrusion 30 and the bracket 89 with the clamp 94 through its support member 95. Write 96, connected to the support member 95 and thereby to the battery 90, extends from the housing 12 through the stick shift 52 into the knob 84, where it is in contact with the stick shift 52. The wire 96 is severed, in advance of such contact, to form a pair of adjacent terminals (not shown). The top of the knob 84 is provided with a spring-tensioned push button 98 adapted, when depressed, to make contact between the adjacent terminals of the wire 96, closing a circuit between the brackets 88 and 89 and activating the lamp 94, as is well known in the art.

In the operation of my selector 10, after it has been assembled and installed on the connecting bar or rail 48 of the bicycle, and the gear cable 72 secured to the gear mechanism of the rear bicycle wheel, as is well known in the art, the selector 10 is prepared to function. As the rider proceeds at a designated speed, let us say, for example, in "1st gear," or low gear, and wishes to transfer to middle speed, he grasps the knob 84 of the stick shift 52, pressing down with his thumb on the push button 98, thereby closing the electrical circuit and lighting up the lamp 94, thus lighting up the disc 34 from below, and rotates the stick shift 52 one notch. The rotation of the stick shift 52 moves the cable 72, causing a shifting of the gear mechanism in the bicycle wheel and, correspondingly, a rotation of the disc 40 to reveal the section 36 thereof provided with the numeral "2" through the disc 34, lit up from below by the lamp 94. Rotation of the stick shift 52 another notch shifts the gears to high speed and, correspondingly, rotates the disc 40 to reveal the lighted section 36 provided with the numeral "3." So long as the push button 98 is depressed to close the electrical circuit the disc 34 will be illuminated from below to reveal the gear speed to which the gears have been shifted. However, the gears need not be shifted in order for the disc 34 to be illuminated, so long as the push button 98 remains depressed, so that, when the bicycle is being operated at night or in dusk or darkness the rider can immediately ascertain the gear speed being used, and also shift to another speed, likewise visibly indicated, by simply depressing the push button 98 while moving the stick shift 52.

Coming now to the modified embodiment shown by FIGS. 5 and 6, there is shown a modified form of gearshift selector 100. This embodiment discloses a selector provided for five different speeds and is designed for horizontal movement of the shift stick or shift arm 118. The housing 102 is provided with a transparent roof 104 and, internally, with a lamp 94 engaged with a battery and a wire circuit (not shown). A transparent plate 106 is disposed within the housing 102 between the lamp 94 and the roof 104, and is divided into seven equal sections, with the top and bottom sections unmarked and the intermediate sections marked "1" to "5," to correspond with the appropriate gearshift speeds available. The upper sides of the plate 106 are grooved and slidably support within the grooves the edges of a slidable opaque plate 108 having an opening 110 corresponding with one of the sections of the plate 106, whereby, by sliding the plate 108 in either direction, a single section of the plate 106 becomes visible through the opening 110.

The housing 102 is further provided with a horizontal slot 114 in its side wall 112, the slot 114 having a series of notches 116 extending upwardly therefrom, each notch 116 aligned with a different numbered section of the plate 106, as shown. A gearshift arm 118 is mounted on the plate 108, adjacent the opening 110 and extends out from the slot 114, as shown. The arm 118 is composed of a spring metal and is so disposed that, at rest, its angle of incline adapts it to remain engaged in one of the notches 116, so that, when it is desired to shift the plate 108 with respect to the plate 106 and thereby to shift the gears correspondingly, the arm 118 must be depressed into the slot 114 and then moved along the slot 114 in the proper direction, to be released at the appropriate notch 116. While it is not shown, it is to be understood that depressing the arm 118 into the slot 114, and so long as it touches the base of the slot 114, causes the lamp 94 and a battery circuit, similar to the one described with respect to the first embodiment, to be activated so that the section exposed through the opening 110 is visible by illumination from below. It is also to be understood, with respect to this embodiment, the cable attachments of the arm 118 and coacting plate 108 with the wheel gear mechanism of the bicycle, similar to those shown and described with respect to the first embodiment, are intended, so that each notch movement of the arm 118 will effect a shift in the gear mechanism to the next speed, higher or lower. It is not believed that repetition of such structure is here necessary.

Further with respect to my invention, and to the preferred embodiments described and shown, provision may be made that each section 36 of the fixed disc 34 in the first embodiment, and each section of plate 106 in the second embodiment, may be colored or tinted in a different transparent or translucent hue, in addition to the numerical markings described, so as to facilitate recognition of the specific gear speed in use as well as the one to which the shifting is made.

The embodiments hereinabove shown and described are by way of illustration and not of limitation, and various changes may be made in the construction, composition and arrangement of parts without limitation upon or departure from the spirit and scope of the invention, or sacrificing any of the advantages thereof inherent therein, which are herein claimed.

Having described my invention, I claim:

1. In association with a bicycle of the type described, an illuminated gearshift selector comprising a housing, means to secure the housing to the bicycle, a fixed transparent panel within the housing disposed adjacent to and visible through the housing roof, a movable opaque panel disposed between the fixed panel and the housing roof, an opening in the movable panel adapted to come in registry with and expose a different section of the fixed panel on movement of the former, a movable stick shift mounted in the housing and extending therefrom, a gear cable engaged at one end to the stick shift for reciprocal movement thereby and at its other end to the gear mechanism of the bicycle, an engagement between the movable panel and the stick shift, means for shifting the shift stick whereby movement of the stick shift causes conjoint shifting of the gear cable to activate a different gear and of the movable panel to expose a different section of the fixed panel through its opening, and means within the housing for selective illumination of the fixed panel from below.

2. An illuminated gearshift selector as described in claim 1, a support member within the housing, the stick shift movable on the support member, a gear wheel in engagement with the stick shift, movable conjointly therewith and mounted on the support member, the gear cable secured at one end to the bicycle gear mechanism and at its other end to the gear wheel for reciprocal movement of the gear cable by the shifting of the stick shift.

3. An illuminated gearshift selector as described in claim 2, the fixed and movable panels comprising each a circular disc, the stick shift rotatably mounted on the support member and the means to shift the movable disc conjointly with the stick shift comprising a spur gear in mesh with the gear wheel and a torque spring secured to the spur gear at one end and to the movable disc at its other end to provide torque rotation of the movable disc upon rotation of the spur gear.

4. An illuminated gearshift selector as described in claim 3, the fixed disc being divided into a plurality of equally spaced sections and the opening in the movable disc adapted to come in registry with a single section at a time of the fixed disc on selective rotation of the stick shift.

5. An illuminated gearshift selector as described in claim 4, the sections of the fixed disc being consecutively marked.

6. An illuminated gearshift selector as described in claim 5, the means to illuminate the fixed disc comprising a battery within the housing, a lamp disposed below the fixed disc, an electrical circuit connecting the lamp with the battery and means to selectively close the circuit.

7. An illuminated gearshift selector as described in claim 6, the means to selectively illuminate the fixed disc comprising an electric wire connecting the lamp and the battery in a circuit, the wire leading intermediately into the head of the stick shift and means in the head of the stick shift for selectively opening and closing the circuit.

8. An illuminated gearshift selector as described in claim 7, the means for selectively opening and closing the circuit comprising a spring-tensioned push button disposed in the head of the stick shift, spaced terminal ends for the electric wire in juxtaposition with one another and said ends being disposed to contact one another upon depression of the push button, to close the circuit, and to break contact upon release of the push button.

9. An illuminated gearshift selector as described in claim 3, means to restrict movement of the shift stick comprising a stick shift base having an irregular, enlarged circumference, a plurality of spaced notches in said circumference, an extrusion of the support member in abutment with said circumference and a bearing disposed in the extrusion adapted selectively to come in registry with a different notch in said circumference when rotation of the stick shift brings them together.

10. In association with a bicycle of the type described, an illuminated gearshift selector comprising a housing, means to secure the housing to the bicycle, a transparent fixed panel provided with raised side channels disposed in the housing adjacent the roof thereof and visible therethrough, an opaque movable panel disposed between the housing roof and the fixed panel and slidable in said channels, an opening in the movable panel adapted to expose a different section of the fixed panel on selective movement of the movable panel, a horizontal slot in the housing wall adjacent the movable panel, a series of spaced notches in communication with the slot, a shift arm angularly mounted on the movable panel and extending out of the slot, the arm disposed to be engaged in a notch in free position and depressible into the slot for lateral movement therein, a gear cable secured at one end to the gear mechanism of the bicycle and at its other end to the movable panel, whereby reciprocal movement of the shift arm causes conjoint movement of the movable panel and the gear cable, and means disposed within the housing to selectively illuminate the fixed panel from below.

11. An alluminated gearshift selector as discribed in claim 10, the fixed panel being divided into a plurality of distinguishable sections.

References Cited

UNITED STATES PATENTS 2,905,017  9/1959  Randolph _____ 74—489
3,443,825  5/1969  Wolf _____ 74—488 XR NORTON ANSHER, Primary Examiner R. P. GREINER, Assistant Examiner U.S. Cl. X.R.

74—488, 489; 116—124; 240—2.1, 7.55; 340—87